US012593208B2

(12) United States Patent
Zhang

(10) Patent No.: US 12,593,208 B2
(45) Date of Patent: Mar. 31, 2026

(54) METHOD, APPARATUS AND SYSTEM FOR NETWORK CONNECTION, AND SERVER AND MEDIUM

(71) Applicant: Beijing Jingdong Qianshi Technology Co., Ltd., Beijing (CN)

(72) Inventor: Lei Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 138 days.

(21) Appl. No.: 18/290,358

(22) PCT Filed: May 24, 2022

(86) PCT No.: PCT/CN2022/094670
§ 371 (c)(1),
(2) Date: Nov. 13, 2023

(87) PCT Pub. No.: WO2023/284417
PCT Pub. Date: Jan. 19, 2023

(65) Prior Publication Data
US 2024/0251243 A1     Jul. 25, 2024

(30) Foreign Application Priority Data
Jul. 15, 2021     (CN) .......................... 202110802229.7

(51) Int. Cl.
*H04W 12/06*          (2021.01)
*H04L 9/40*           (2022.01)
(Continued)

(52) U.S. Cl.
CPC ........... *H04W 12/068* (2021.01); *H04L 63/20* (2013.01); *H04W 12/08* (2013.01); *H04W 76/15* (2018.02)

(58) Field of Classification Search
CPC ......... H04L 63/18; H04L 63/08; H04L 63/20; H04L 67/12; H04L 63/083; H04W 12/068;
(Continued)

(56) References Cited

U.S. PATENT DOCUMENTS 9,549,366 B2     1/2017  Ekberg et al.
10,334,432 B2    6/2019  Lee et al.
(Continued)

FOREIGN PATENT DOCUMENTS

CN          103548392 A     1/2014
CN          104427380 A     3/2015
(Continued)

OTHER PUBLICATIONS

"Integrated Tutorial on Broadband Access Technology", Kuandai, Jieru Jishu Yitihua Jiaocheng, with English language abstract, pp. 166-182, , Jan. 31, 2020.
(Continued)

*Primary Examiner* — Tri M Tran
(74) *Attorney, Agent, or Firm* — BLANK ROME LLP

(57)                    ABSTRACT

Disclosed in the embodiments of the present disclosure are a method, apparatus and system for a network connection, and a server and a medium. The method may include: determining whether a preset network credential update condition is met, wherein a network credential indicated by the preset network credential update condition is used for establishing a connection of a target network; in response to determining that the preset network credential update condition is met, sending an updated network credential to at least one mobile terminal by using a preset backup connection method; receiving a connection request for the target network that is sent by a target mobile terminal; and in response to determining that the connection request for the
(Continued)

400

| Determining that a preset network credential update condition is met, in response to determining that there is a mobile terminal arriving at a preset network alternating area | 401 |

| Sending an updated network credential to the mobile terminal arriving at the preset network alternating area using a preset spare connection mode, in response to determining that the preset network credential update condition is met | 402 |

| Receiving a connection request for a target network that is sent by a target mobile terminal | 403 |

| Establishing a connection of the target network with the target mobile terminal, in response to determining that the connection request for the target network matches the updated network credential | 404 | target network matches the updated network credential, establishing the connection of the target network to the target mobile terminal.

19 Claims, 7 Drawing Sheets

(51) Int. Cl.
  *H04W 12/08*    (2021.01)
  *H04W 76/15*    (2018.01)
(58) Field of Classification Search
  CPC ..... H04W 12/06; H04W 84/12; H04W 76/10; H04W 76/15; H04W 12/08; H04W 4/80; H04W 12/64; H04W 12/61
  See application file for complete search history.

(56) References Cited

U.S. PATENT DOCUMENTS

| | | |
|---|---|---|
| 10,491,581 B2 | 11/2019 | Chen et al. |
| 10,917,925 B2 | 2/2021 | Taskin et al. |
| 2013/0007858 A1 | 1/2013 | Shah et al. |
| 2015/0040195 A1 | 2/2015 | Park |
| 2017/0353454 A1 | 12/2017 | Cooper et al. |
| 2018/0115892 A1 | 4/2018 | Kotay et al. |
| 2019/0223248 A1* | 7/2019 | Chandran ........... H04L 12/2803 |
| 2020/0139995 A1* | 5/2020 | Loch ....................... H04L 63/18 |
| 2020/0252848 A1 | 8/2020 | Asai |
| 2021/0243603 A1 | 8/2021 | Yin et al. |

FOREIGN PATENT DOCUMENTS

| | | | | |
|---|---|---|---|---|
| CN | 106993278 A | 7/2017 | | |
| CN | 108900388 A | 11/2018 | | |
| CN | 109548018 A | 3/2019 | | |
| CN | 109981312 A | 7/2019 | | |
| CN | 110169028 A | 8/2019 | | |
| CN | 110602692 A * | 12/2019 | ........... | H04W 12/06 |
| CN | 110710162 A | 1/2020 | | |
| CN | 112492594 A | 3/2021 | | |
| CN | 112714444 A | 4/2021 | | |
| CN | 112825574 A | 5/2021 | | |
| CN | 113490214 A | 10/2021 | | |
| JP | 2004171294 A | 6/2004 | | |
| JP | 2004355242 A | 12/2004 | | |
| JP | 2020127132 A | 8/2020 | | |
| JP | 2022125493 A * | 8/2022 | ............. | H04W 4/46 |
| WO | 2004084463 A2 | 9/2004 | | |
| WO | 2018095436 A1 | 5/2018 | | |

OTHER PUBLICATIONS

"Introduction to Intelligent Manufacturing" China Machine Press, with English language abstract. pp. 120-124, May 31, 2021.
Rejection Decision for Chinese Application No. 113490214A, dated Dec. 4, 2024, 8 pages.
Extended European Search Report for European Application No. 22841057.7, dated Jan. 31, 2025.
Office Action issued in Australian Patent Application No. 2022312530, mailed on Aug. 25, 2025, 7 pages.
International search report issued Aug. 23, 2022 in corresponding PCT application No. PCT/CN2022/094670. 4 pages.

* cited by examiner

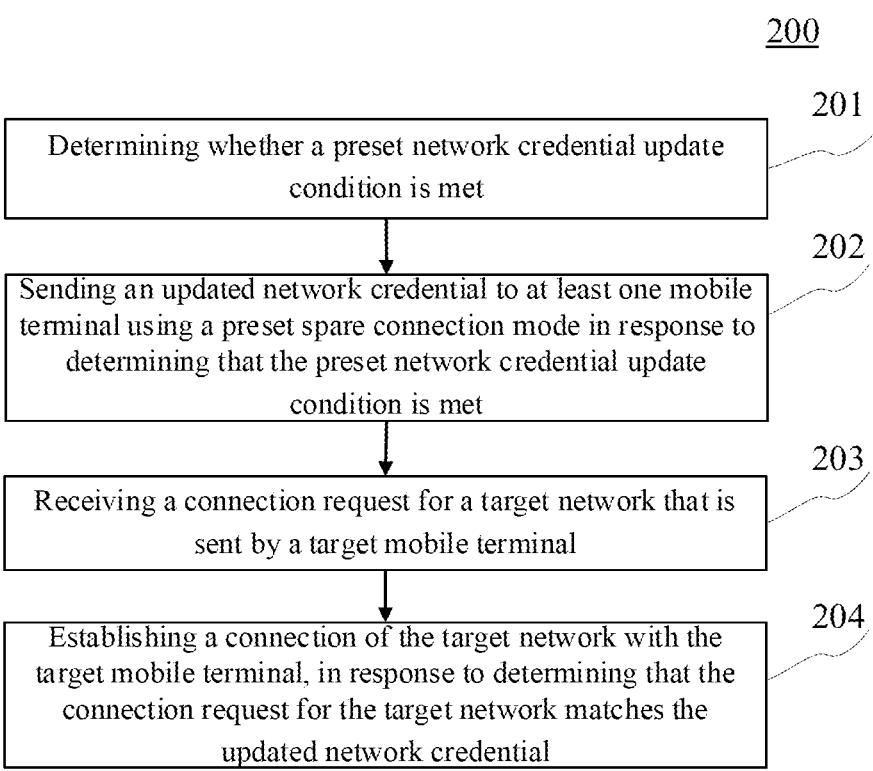

200

201

Determining whether a preset network credential update condition is met

202

Sending an updated network credential to at least one mobile terminal using a preset spare connection mode in response to determining that the preset network credential update condition is met

203

Receiving a connection request for a target network that is sent by a target mobile terminal

204

Establishing a connection of the target network with the target mobile terminal, in response to determining that the connection request for the target network matches the updated network credential

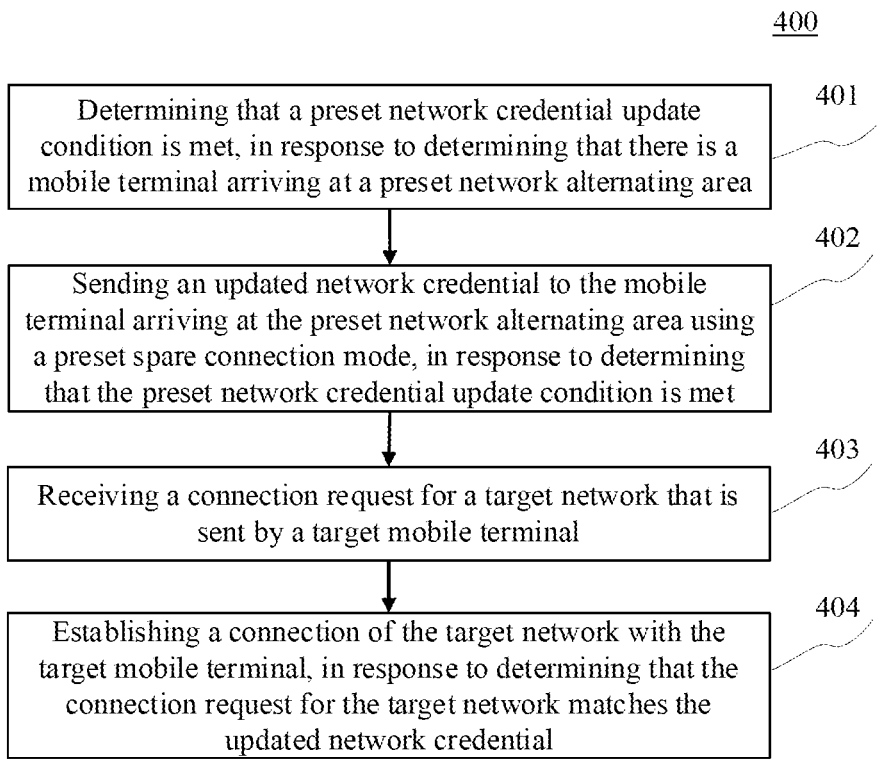

400

Determining that a preset network credential update
condition is met, in response to determining that there is a
mobile terminal arriving at a preset network alternating area

401

Sending an updated network credential to the mobile
terminal arriving at the preset network alternating area using
a preset spare connection mode, in response to determining
that the preset network credential update condition is met

402

Receiving a connection request for a target network that is
sent by a target mobile terminal

403

Establishing a connection of the target network with the
target mobile terminal, in response to determining that the
connection request for the target network matches the
updated network credential

METHOD, APPARATUS AND SYSTEM FOR NETWORK CONNECTION, AND SERVER AND MEDIUM

CROSS REFERENCE TO RELATED APPLICATIONS

This patent application is a National Stage of International Application No. PCT/CN2022/094670, filed on May 24, 2022, which claims the priority from Chinese Patent Application No. 202110802229.7, filed on Jul. 15, 2021 and entitled "Method, Apparatus and System for Network Connection, Server and Medium," the entire disclosures of which are hereby incorporated by reference.

TECHNICAL FIELD

Embodiments of the present disclosure relate to the field of computer technology, and specifically to a method, apparatus and system for a network connection, a server and a medium.

BACKGROUND

With the development of Internet technology, mobile robot technology has also been widely applied in fields such as logistics and inspection.

SUMMARY

Embodiments of the present disclosure propose a method, apparatus and system for a network connection, a server and a medium.

In a first aspect, an embodiment of the present disclosure provides a method for a network connection, including: determining whether a preset network credential update condition is met, where a network credential indicated by the preset network credential update condition is used for establishing a connection to a target network; sending an updated network credential to at least one mobile terminal using a preset spare connection mode in response to determining that the preset network credential update condition is met; receiving a connection request for the target network that is sent by a target mobile terminal; and establishing the connection of the target network with the target mobile terminal, in response to determining that the connection request for the target network matches the updated network credential.

In some embodiments, determining whether the preset network credential update condition is met includes: determining whether the network credential changes; and determining that the preset network credential update condition is met, in response to determining that the network credential changes.

In some embodiments, determining whether the network credential changes includes: determining that the network credential changes, in response to receiving a network credential change instruction.

In some embodiments, determining whether the preset network credential update condition is met includes: determining that the preset network credential update condition is met, in response to determining that a current moment reaches preset network credential change time.

In some embodiments, determining whether the preset network credential update condition is met includes: determining that the preset network credential update condition is met, in response to determining that there is a mobile terminal arriving at a preset network alternating area, and sending the updated network credential to at least one mobile terminal using the preset spare connection mode in response to determining that the preset network credential update condition is met includes: sending the updated network credential to the mobile terminal arriving at the preset network alternating area using the preset spare connection mode, in response to determining that the preset network credential update condition is met.

In some embodiments, the connection request includes a newest network credential acquired by the target mobile terminal, and sending the updated network credential to at least one mobile terminal using the preset spare connection mode includes: broadcasting and sending the updated network credential to the at least one mobile terminal using a long range radio (LoRa).

In a second aspect, an embodiment of the present disclosure provides an apparatus for a network connection, including: a determining unit, configured to determine whether a preset network credential update condition is met, where a network credential indicated by the preset network credential update condition is used for establishing a connection to a target network; a sending unit, configured to send an updated network credential to at least one mobile terminal using a preset spare connection mode in response to determining that the preset network credential update condition is met; a receiving unit, configured to receive a connection request for the target network that is sent by a target mobile terminal; and a connecting unit, configured to establish the connection of the target network with the target mobile terminal, in response to determining that the connection request for the target network matches the updated network credential.

In some embodiments, the determining unit includes: a first determining module, configured to determine whether the network credential changes; and a second determining module, configured to determine that the preset network credential update condition is met, in response to determining that the network credential changes.

In some embodiments, the first determining module is further configured to: determine that the network credential changes, in response to receiving a network credential change instruction.

In some embodiments, the determining unit is further configured to: determine that the preset network credential update condition is met, in response to determining that a current moment reaches preset network credential change time.

In some embodiments, the determining unit is further configured to: determine that the preset network credential update condition is met, in response to determining that there is a mobile terminal arriving at a preset network alternating area. The sending unit is further configured to: send the updated network credential to the mobile terminal arriving at the preset network alternating area using the preset spare connection mode, in response to determining that the preset network credential update condition is met.

In some embodiments, the connection request includes a newest network credential acquired by the target mobile terminal. The sending unit is further configured to: broadcast and send the updated network credential to the at least one mobile terminal using a long range radio (LoRa).

In a third aspect, an embodiment of the present disclosure provides a system for a network connection, including: a service side configured to implement the method according to any implementation in the first aspect; and a mobile terminal includes a mobile robot, configured to receive an updated network credential using a preset spare connection mode, and send a connection request for the target network to the service side.

In some embodiments, the mobile terminal is further configured to: stop traveling, in response to detecting that a distance from a long range radio (LoRa) transmission terminal is less than a preset distance; and resume traveling, in response to detecting that the distance from the LoRa transmission terminal is not less than the preset distance.

In a fourth aspect, an embodiment of the present disclosure provides a server, the server including one or more processors; and a storage apparatus, storing one or more programs. The one or more programs, when executed by the one or more processors, cause the one or more processors to implement the method according to any implementation in the first aspect.

In a fifth aspect, an embodiment of the present disclosure provides a computer readable medium, storing a computer program, where the program, when executed by a processor, implements the method according to any implementation in the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent.

FIG. 2 is a flowchart of an embodiment of a method for a network connection according to the present disclosure;

FIG. 4 is a flowchart of another embodiment of the method for a network connection according to the present disclosure;

DETAILED DESCRIPTION OF EMBODIMENTS

The present disclosure is further described below in detail by combining the accompanying drawings and the embodiments. It may be appreciated that the specific embodiments described herein are merely used for explaining the relevant disclosure, rather than limiting the disclosure. In addition, it should be noted that, for ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
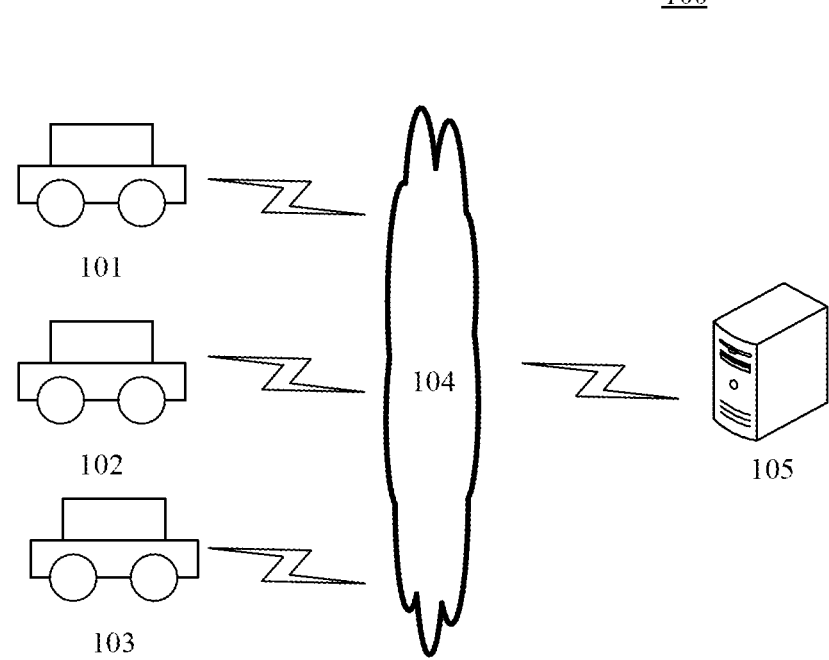
FIG. 1 is a diagram of an exemplary system architecture in which an embodiment of the present disclosure may be applied.

FIG. 1 illustrates an exemplary system architecture 100 in which a method for a network connection or an apparatus for a network connection according to the present disclosure may be applied.

As shown in FIG. 1, the system architecture 100 may include mobile terminal devices 101, 102 and 103, a network 104 and a server 105. The network 104 serves as a medium providing a communication link between the mobile terminal devices 101, 102 and 103 and the server 105. The network 104 may include various types of connections, for example, wired or wireless communication links, or optical fiber cables.

The mobile terminal devices 101, 102 and 103 may interact with the server 105 via the network 104, to receive or send a message, etc.

The mobile terminal devices 101, 102 and 103 may be hardware or software. When being the hardware, the mobile terminal devices 101, 102 and 103 may be various electronic devices having a mobile apparatus and supporting autonomous movement, the electronic devices including, but not limited to, an inspection vehicle, a logistics transportation vehicle, and the like. When being the software, the mobile terminal devices 101, 102 and 103 may be installed in the above electronic devices. The mobile terminal devices 101, 102 and 103 may be implemented as a plurality of pieces of software or a plurality of software modules (e.g., software or software modules for providing a distributed service), or as a single piece of software or a single software module, which will not be specifically limited here.

The server 105 may be a server providing various services, for example, a backend server that provides support for movement policies of the mobile terminal devices 101, 102 and 103. The backend server may receive, through the network, the status reported by the above mobile terminal devices 101, 102 and 103, and may feed back the generated processing result (e.g., a movement instruction) to the mobile terminal devices.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically limited here.

It should be noted that the method for a network connection provided in the embodiments of the present disclosure is generally performed by the server 105, and correspondingly, the apparatus for a network connection is generally provided in the server 105.

It should be appreciated that the numbers of the mobile terminal devices, the networks and the servers in FIG. 1 are merely illustrative. Any number of mobile terminal devices, networks and servers may be provided based on actual requirements.

Further referring to FIG. 2, FIG. 2 illustrates a flow 200 of an embodiment of a method for a network connection according to the present disclosure. The method for a network connection includes the following steps.

Step 201, determining whether a preset network credential update condition is met.

In this embodiment, an executing body (e.g., the server 105 shown in FIG. 1) of the method for a network connection may determine, by various means, whether the preset network credential update condition is met. Here, the network credential indicated by the above preset network credential update condition is used for establishing a connection to a target network. As an example, the above network credential may include an account name and a password. As another example, the above network credential may include a key.

In this embodiment, as an example, in response to detecting that a network is configured for the first time, the above executing body may determine that the preset network credential update condition is met. Alternatively, the above executing body may use the network credential of the network that is set when the network is configured for the first time as an updated network credential.

In this embodiment, as another example, in response to detecting that there is a mobile terminal where a heartbeat timeout occurs, the above executing body may determine that the preset network credential update condition is met. In this embodiment, the heartbeat timeout of the mobile terminal refers to the interruption of the communication of the mobile terminal with the network (i.e., the disconnection of the mobile terminal from the network).

In some alternative implementations of this embodiment, the above executing body may determine whether the preset network credential update condition is met through the following steps.

In a first step, it is determined whether the network credential changes.

In these implementations, the above executing body may determine whether the network credential changes in various ways. As an example, the above executing body may detect whether the network credential is modified.

Alternatively, based on the above alternative implementations, in response to receiving a network credential change instruction, the above executing body may determine that the network credential changes.

In these implementations, the network credential change instruction may be generated based on a modification of a technician on the network credential through a configuration side.

Based on the above alternative implementations, this scheme can be applied to various scenarios where it is required to dynamically replace a key, thereby improving the security and flexibility of the setting of the network.

In a second step, in response to determining that the network credential changes, it is determined whether the preset network credential update condition is met.

In these implementations, in response to determining that the network credential determined in the first step changes, it is determined whether the preset network credential update condition is met.

Based on the above alternative implementations, in this scheme, it is possible to determine whether the preset network credential update condition is met by detecting whether the network credential changes.

In some alternative implementations of this embodiment, in response to determining that a current time reaches preset network credential change time, the above executing body may determine that the preset network credential update condition is met.

In these implementations, the above preset network credential change time may be flexibly set according to application requirements, for example, after 2 hours. Alternatively, the above preset network credential change time may be periodic. For example, a change is made at a certain moment of every day or a change is made at a certain moment of every week.

Based on the above alternative implementations, this scheme can be applied to various scenarios where it is required to dynamically replace a key, thereby improving the security and flexibility of the setting of the network.

Step 202, sending an updated network credential to at least one mobile terminal using a preset spare connection mode in response to determining that the preset network credential update condition is met.

In this embodiment, in response to determining that the preset network credential update condition in step 201 is met, the above executing body may send, in various ways, the updated network credential to the at least one mobile terminal using the preset spare connection mode. Here, the above spare connection mode may be an other communication technique different from the above connection to the target network. As an example, when the target network refers to Wi-Fi, the above preset spare connection mode may refer to Bluetooth, Narrow Band (NB), or the like. The above at least one mobile terminal may generally include a mobile terminal connected with the above executing body through the above target network.

In this embodiment, as an example, in response to determining that the preset network credential update condition is met, the above executing body may first acquire, in various ways, the above updated network credential. Here, the way in which the above executing body acquires the above updated network credential may be adapted to the way in which the above executing body determines whether the preset network credential update condition is met, and thus will not be repeatedly described here. Then, the above executing body may use the above preset spare connection mode to send, to the above at least one mobile terminal, the acquired updated network credential associated with the network credential indicated by the preset network credential update condition in step 201.

In some alternative implementations of this embodiment, the above executing body may broadcast and send the updated network credential to the at least one mobile terminal using a long range Radio (LoRa).

It should be noted that LoRa typically has a two-way communication (transmission and reception). Based on the above alternative implementations, in this scheme, it is possible to use the LoRa transmission port of the above executing body to broadcast and send the updated network credential to the dual-communication LoRa module provided on each mobile terminal device, thereby implementing the issuance of the updated network credential.

Step 203, receiving a connection request for a target network that is sent by a target mobile terminal.

In this embodiment, the above executing body may receive the connection request for the target network that is sent by the target mobile terminal. Here, the above target mobile terminal may generally include a mobile terminal that receives the updated network credential sent in step 202, that is, at least one of the at least one mobile terminal in step 202.

In some alternative implementations of this embodiment, the above connection request may include a newest network credential acquired by the target mobile terminal.

Based on the above alternative implementations, this scheme can be applied to a scenario where a mobile terminal device attempts to connect to the target network using the newest network credential.

Step 204, establishing a connection of the target network with the target mobile terminal, in response to determining that the connection request for the target network matches the updated network credential.

In this embodiment, in response to determining that the connection request for the target network that is received in step 203 matches the updated network credential, the above executing body may establish the connection of the target network with the target mobile terminal. Accordingly, the connection with the target network of the mobile terminal can be restored through the updated network credential.

Figure 3:
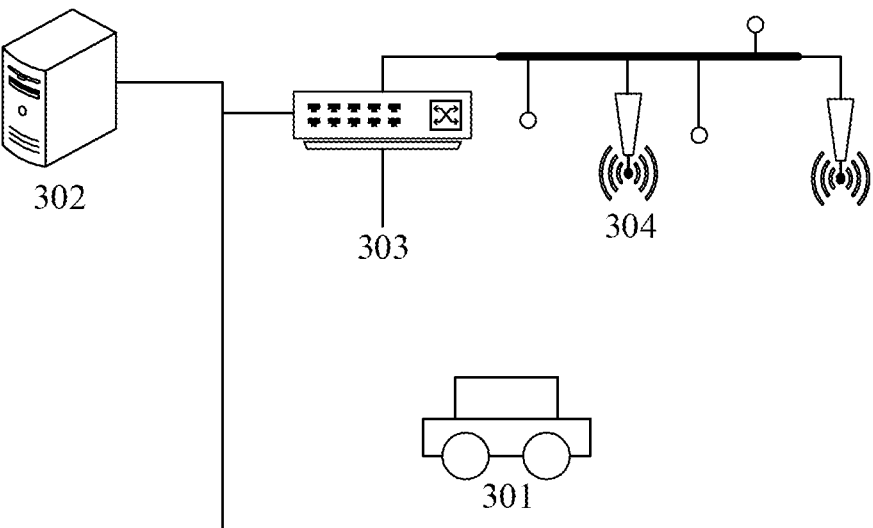
FIG. 3 is a schematic diagram of an application scenario of the method for a network connection according to the embodiment of the present disclosure.

Further referring to FIG. 3, FIG. 3 is a schematic diagram of an application scenario of the method for a network connection according to the embodiment of the present disclosure. In the application scenario of FIG. 3, a logistics robot 301 communicates with a backend server 302 through a Wi-Fi wireless network. A local exchange 303 and a plurality of wireless access points (APs) constitute a wireless Wi-Fi network. In general, the logistics robot 301 may report the position of the logistics robot 301 to the backend server 302 periodically (e.g., every 500 ms) through the Wi-Fi. When a new key is replaced for the Wi-Fi, the logistics robot 301 cannot connect to the Wi-Fi network through the originally stored key, and therefore cannot send a heartbeat signal. The backend server 302 may determine that a preset network credential update condition is met, by not receiving the heartbeat signal sent by the logistics robot 301 or detecting the replacement of the new key over a preset period of time. Therefore, the backend server 302 may issue an updated network credential to the logistics robot 301 using a preset Bluetooth connection mode. The logistics robot 301 receives the updated network credential issued by the backend server 302, and resends a Wi-Fi connection request containing the updated network credential. The backend server 302 re-establishes the Wi-Fi connection with the logistics robot 302 in response to determining that the network credential contained in the received connection request sent by the logistics robot 302 is consistent with the updated network credential.

At present, one of the related arts generally refers to that a Wi-Fi connection is performed between the cloud control system of a mobile robot and the mobile robot mainly through an account and a password that are fixedly configured, and accordingly can not be adapted to the scenario where the key is updated irregularly due to a security requirement, which makes the rapid deployment difficult when the account and the password are changed. However, according to the method provided in the above embodiment of the present disclosure, the updated network credential is issued through the preset spare connection mode when the preset network credential update condition is met in a preset standby connection manner, and the connection of the target network with the target mobile terminal is restored when the received connection request matches the updated network credential, thereby implementing the issuance of the updated network credential and the restoration of the network. Accordingly, a technical basis is provided for the network connection and rapid deployment in the scenario of a dynamic key.

Further referring to FIG. 4, FIG. 4 illustrates a flow 400 of another embodiment of the method for a network connection. The flow 400 of the method for a network connection includes the following steps.

Step 401, determining that a preset network credential update condition is met, in response to determining that there is a mobile terminal arriving at a preset network alternating area.

In this embodiment, an executing body (e.g., the server 105 shown in FIG. 1) of the method for a network connection may first determine whether there is the mobile terminal arriving at the preset network alternating area. Here, the above preset network alternating area may be used to indicate a junction area between two areas within the coverage ranges of different networks. In response to determining that there is the mobile terminal arriving at the preset network alternating area, the above executing body may determine that the preset network credential update condition is met. Here, the network credential indicated by the above preset network credential update condition may be used for establishing a connection to a target network.

Step 402, sending an updated network credential to the mobile terminal arriving at the preset network alternating area using a preset spare connection mode, in response to determining that the preset network credential update condition is met.

In this embodiment, in response to determining that the preset network credential update condition in step 401 is met, the above executing body may send the updated network credential to the mobile terminal arriving at the preset network alternating area using the preset spare connection mode. Here, for the way in which the updated network credential is sent using the preset spare connection mode, reference may be made to the description of step 202 and the alternative implementation thereof in the foregoing embodiment, and thus, the details will not be repeatedly described here.

In some alternative implementations of this embodiment, the above executing body may alternatively be a backend server for issuing the motion path of the mobile terminal. Therefore, alternatively, according to the position of the above mobile terminal arriving at the preset network alternating area, the above executing body may use the preset spare connection mode in advance to send the updated network credential to the mobile terminal arriving at the preset network alternating area.

Step 403, receiving a connection request for a target network that is sent by a target mobile terminal.

Step 404, establishing a connection of the target network with the target mobile terminal, in response to determining that the connection request for the target network matches the updated network credential.

In some alternative implementations of this embodiment, the above connection request may include a newest network credential acquired by the target mobile terminal. The above executing body may broadcast and send the updated network credential to the mobile terminal arriving at the preset network alternating area using a LoRa.

The steps 403 and 404 may be respectively consistent with the steps 203 and 204 and the alternative implementations thereof in the foregoing embodiment. The above descriptions for the steps 203 and 204 and the alternative implementations thereof are also applicable to the steps 403 and 404, and thus will not be repeatedly described here.

As can be seen from FIG. 4, the flow 400 of the method for a network connection in this embodiment reflects the step of determining that the preset network credential update condition is met in response to determining that there is the mobile terminal arriving at the preset network alternating area and the step of sending the updated network credential to the mobile terminal arriving at the preset network alternating area using the preset spare connection mode in response to determining that the preset network credential update condition is met. Accordingly, in the scheme described in this embodiment, it is possible to automatically issue a matching network credential when it is detected that the mobile terminal device runs across a network area, which realizes the unobstructed traveling of the mobile terminal device under the premise of automatically connecting to a changeable network such as a new network across the area, thereby improving the work efficiency.

Figure 5:
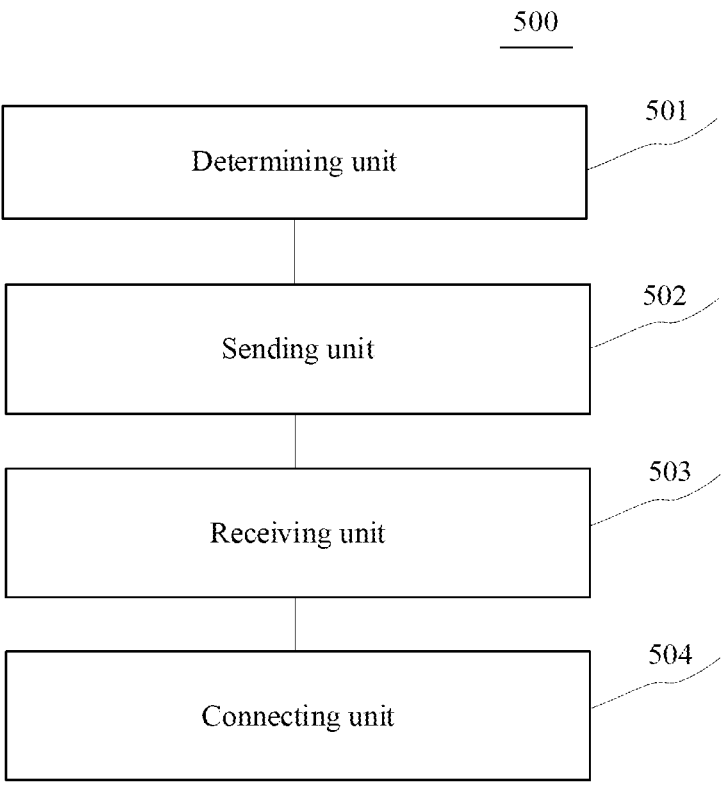
FIG. 5 is a schematic structural diagram of an embodiment of an apparatus for a network connection according to the present disclosure.

Further referring to FIG. 5, as an implementation of the method shown in the above drawings, the present disclosure provides an embodiment of an apparatus for a network connection. The embodiment of the apparatus corresponds to the embodiment of the method shown in FIG. 2 or FIG. 4. The apparatus may be applied in various electronic devices.

As shown in FIG. 5, the apparatus 500 for a network connection provided in the embodiment includes: a determining unit 501, a sending unit 502, a receiving unit 503 and a connecting unit 504. Here, the determining unit 501 is configured to determine whether a preset network credential update condition is met. Here, a network credential indicated by the preset network credential update condition is used for establishing a connection to a target network. The sending unit 502 is configured to send an updated network credential to at least one mobile terminal using a preset spare connection mode in response to determining that the preset network credential update condition is met. The receiving unit 503 is configured to receive a connection request for the target network that is sent by a target mobile terminal. The connecting unit 504 is configured to establish the connection of the target network with the target mobile terminal, in response to determining that the connection request for the target network matches the updated network credential.

In this embodiment, for specific processes of the determining unit 501, the sending unit 502, the receiving unit 503 and the connecting unit 504 in the apparatus 500 for a network connection, and their technical effects, reference may be respectively made to step 201, step 202, step 203 and step 204 in the corresponding embodiment of FIG. 2, and thus, the details will not be repeatedly described here.

In some alternative implementations of this embodiment, the above determining unit 501 may comprise: a first determining module (not shown), configured to determine whether the network credential changes; and a second determining module (not shown), configured to determine that the preset network credential update condition is met, in response to determining that the network credential changes.

In some alternative implementations of this embodiment, the above first determining module may be further configured to: determine that the network credential changes, in response to receiving a network credential change instruction.

In some alternative implementations of this embodiment, the above determining unit 501 may be further configured to: determine that the preset network credential update condition is met, in response to determining that a current moment reaches preset network credential change time.

In some alternative implementations of this embodiment, the above determining unit 501 may be further configured to: determine that the preset network credential update condition is met, in response to determining that there is a mobile terminal arriving at a preset network alternating area. The above sending unit 502 may be further configured to: send the updated network credential to the mobile terminal arriving at the preset network alternating area using the preset spare connection mode, in response to determining that the preset network credential update condition is met.

In some alternative implementations of this embodiment, the above connection request may comprise a newest network credential acquired by the target mobile terminal. The above sending unit 502 may be further configured to: broadcast and send the updated network credential to the at least one mobile terminal using a long range radio (LoRa).

According to the apparatus provided in the above embodiment of the present disclosure, the sending unit 502 uses the preset spare connection mode to issue the updated network credential when the determining unit 501 determines that the preset network credential update condition is met, and the connecting unit 504 restores the connection of the target network with the target mobile terminal when the connection request received by the receiving unit 503 matches the updated network credential, thereby implementing the issuance of the updated network credential and the restoration of the network. Accordingly, a technical basis is provided for the network connection and rapid deployment in the scenario of a dynamic key.

Figure 6:
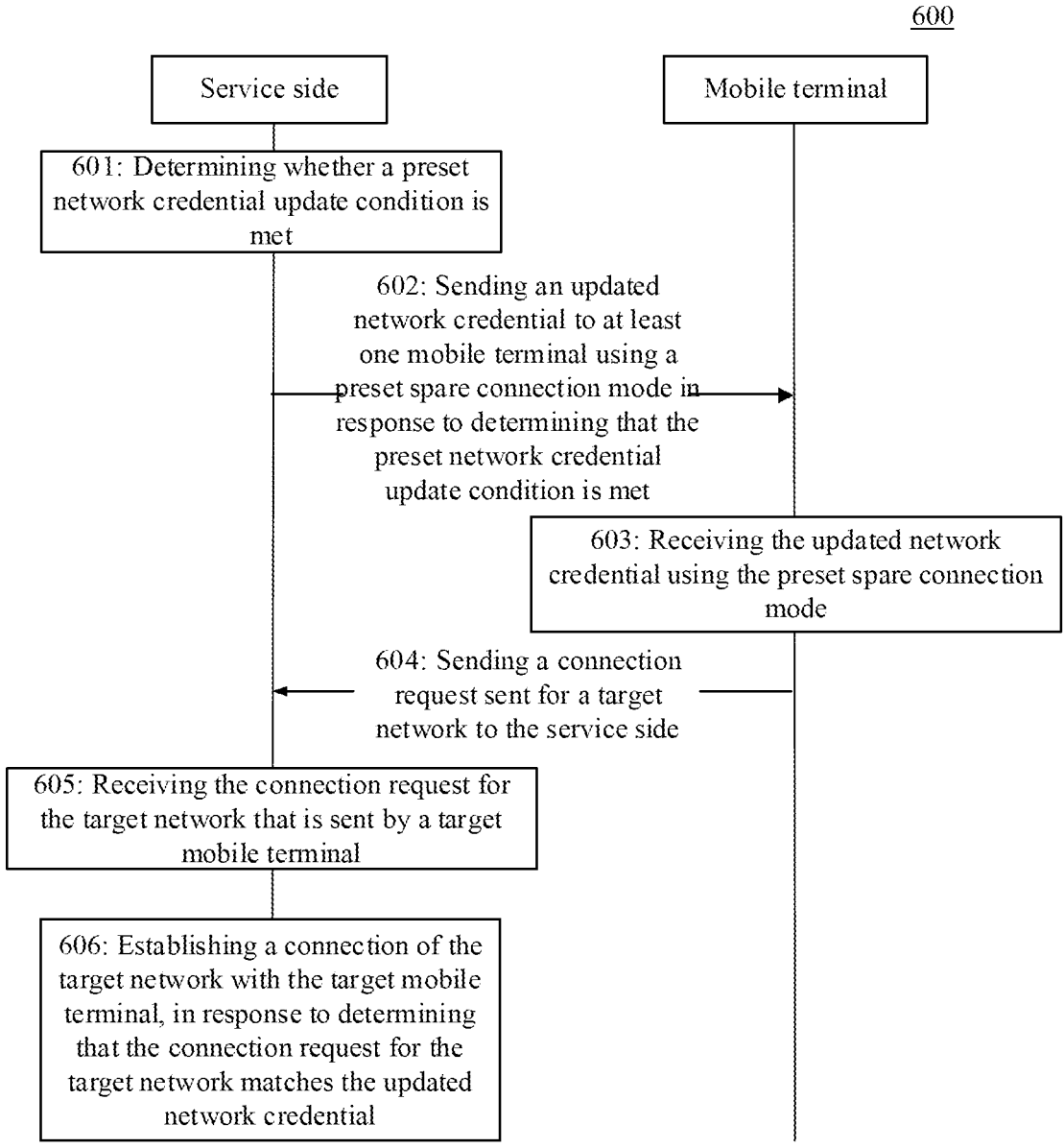
FIG. 6 is a sequence diagram of interaction between devices in an embodiment of a system for a network connection according to the present disclosure.

Further referring to FIG. 6, FIG. 6 illustrates a timing sequence 600 of interaction between devices in an embodiment of a system for a network connection. The system for a network connection may comprise: a mobile terminal (e.g., the mobile terminal devices 101, 102 and 103 shown in FIG. 1) and a service side (e.g., the server 105 shown in FIG. 1). Here, the above mobile terminal includes a mobile robot, and is configured to receive an updated network credential using a preset spare connection mode, and send a connection request for a target network to the service side. The above service side may be configured to implement the method for a network connection as described in the forgoing embodiments.

In some alternative implementations of this embodiment, the above mobile terminal is further configured to: stop traveling, in response to detecting that a distance from a LoRa transmission terminal is less than a preset distance; and resume traveling, in response to detecting that the distance from the LoRa transmission terminal is not less than the preset distance.

As shown in FIG. 6, in step 601, the service side determines whether a preset network credential update condition is met.

In step 602, the service side sends the updated network credential to at least one mobile terminal using the preset spare connection mode, in response to determining that the preset network credential update condition is met.

In step 603, the mobile terminal receives the updated network credential using the preset spare connection mode.

In this embodiment, the mobile terminal receives the updated network credential using the preset spare connection mode. The above preset spare connection mode may be consistent with the corresponding description in step 202 in the foregoing embodiment, and thus will not be repeatedly described here.

In step 604, the mobile terminal sends the connection request sent for the target network to the service side.

In this embodiment, the above connection request sent for the target network may include the received updated network credential.

In step 605, the service side receives the connection request for the target network that is sent by a target mobile terminal.

In step 606, the service side establishes the connection of the target network with the target mobile terminal, in response to determining that the connection request for the target network matches the updated network credential.

The above steps 601, 602, 605 and 606 may be respectively consistent with the steps 201-204 and the alternative implementations thereof in the foregoing embodiment. The above descriptions for the steps 201-204 and the alternative implementations thereof are also applicable to the steps 601, 602, 605 and 606, and thus, the details will not be repeatedly described here.

In some alternative implementations of this embodiment, the mobile terminal stops traveling, in response to detecting that the distance from the LoRa transmission terminal is less than the preset distance, and the mobile terminal resumes traveling, in response to detecting that the distance from the LoRa transmission terminal is not less than the preset distance.

Based on the above alternative implementations, this scheme can be applicable to a scenario where a technician wearing a LoRa signal transmission terminal enters a place. When the technician passes freely in the place, the mobile terminal can stop traveling when being at a certain distance (e.g., 3 meters) from the technician, thereby realizing the avoidance for the technician. Moreover, the built-in LoRa communication module of the mobile terminal can not only realize the above functions, but also issue the updated network credential as a spare connection, thereby realizing the reuse of functions and saving costs.

According to the system for a network connection provided in the above embodiment of the present disclosure, the service side first determines whether the preset network credential update condition is met, the network credential indicated by the preset network credential update condition being used for establishing the connection to the target network. In response to determining that the preset network credential update condition is met, the service side sends the updated network credential to the at least one mobile terminal using the preset spare connection mode. The mobile terminal receives the updated network credential using the preset spare connection mode. The mobile terminal sends the connection request sent for the target network to the service side. In response to determining that the received connection request for the target network matches the updated network credential, the service side establishes the connection of the target network with the target mobile terminal. Therefore, the issuance of the updated network credential and the restoration of the network are implemented. Accordingly, a technical basis is provided for the network connection and rapid deployment of the mobile robot in the scenario of a dynamic key.

Figure 7:
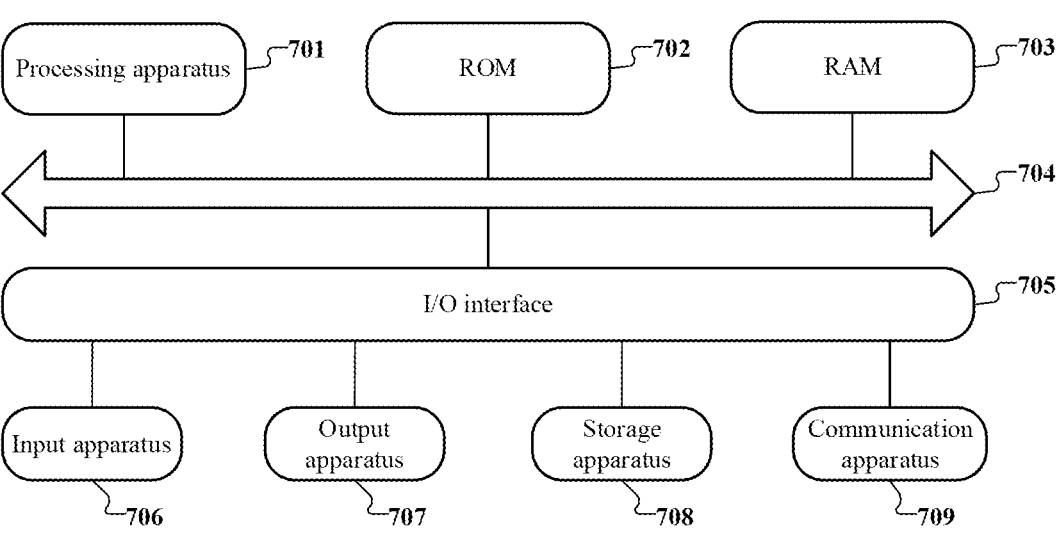
FIG. 7 is a schematic structural diagram of an electronic device adapted to implement embodiments of the present disclosure.

Referring to FIG. 7, FIG. 7 is a schematic structural diagram of an electronic device (e.g., the server 105 in FIG. 1) 700 adapted to implement embodiments of the present disclosure. The server shown in FIG. 7 is merely an example, and should not bring any limitation to the functions and the scope of use of the embodiments of the present disclosure.

As shown in FIG. 7, the electronic device 700 may include a processing apparatus (e.g. a central processing unit, a graphics processor, etc.) 701, which can perform various appropriate actions and processes depending on programs stored in read-only memory (ROM) 702 or loaded from the storage apparatus 708 into random access memory (RAM) 703. In RAM 703, various programs and data required for the operation of the electronic device 700 are also stored. The processing apparatus 701, ROM 702, and RAM 703 are connected to each other via bus 704. The input/output (I/O) interface 705 is also connected to bus 704.

Generally, the following apparatus may be connected to the I/O interface 705: input apparatus 706 including such as a touch screen, a touchpad, a keyboard, a mice, etc.; an output apparatus 707 including such as a Liquid Crystal Display (LCD), a loudspeaker, a vibrator, etc.; a storage apparatus 708 including such as a magnetic tape, a hard disk, etc.; and a communication apparatus 709. A communication apparatus 709 may allow the electronic device 700 to communicate wirelessly or wired with other devices to exchange data. Although FIG. 7 shows an electronic device 700 with various apparatus, it should be understood that it is not required to implement or have all of the apparatus shown. It may be implemented alternatively or have more or fewer apparatus. Each box shown in FIG. 7 can represent one apparatus or multiple apparatus as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 709, or be installed from the storage apparatus 708, or be installed from the ROM 702. The computer program, when executed by the processing apparatus 701, implements the above-mentioned functionalities as defined by the method of the present disclosure.

It should be noted that the computer readable medium in the present disclosure may be computer readable signal medium or computer readable storage medium or any combination of the above two. The computer readable storage medium of an embodiment of the present disclosure may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be contained in the electronic device; or may exist alone and not be assembled into the server. The computer readable medium carries one or more programs, which when the one or more programs are executed by the server, cause the server to: determine whether a preset network credential update condition is met, where a network credential indicated by the preset network credential update condition is used for establishing a connection to a target network; send an updated network credential to at least one mobile terminal using a preset spare connection mode in response to determining that the preset network credential update condition is met; receive a connection request for the target network that is sent by a target mobile terminal; and establish the connection of the target network with the target mobile terminal, in response to determining that the connection request for the target network matches the updated network credential.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. The described units may also be provided in a processor. For example, the processor may be described as: a processor including a determining unit, a sending unit, a receiving unit and a connecting unit. Here, the names of these units do not in some cases constitute a limitation to such units themselves. For example, the determining unit may alternatively be described as "a unit for determining whether a preset network credential update condition is met, where a network credential indicated by the preset network credential update condition is used for establishing a connection to a target network."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for transmitting updated network connection credentials via a preset backup communication channel, the method being performed by a server, the method comprising:

sending, in response to determining that there is a first target mobile terminal arriving at a preset network alternating area, an updated network credential of a first target network to the first target mobile terminal using a preset spare connection mode, wherein the first target mobile terminal comprises a mobile robot, wherein the preset network alternating area comprises a junction area between two areas within coverage ranges of different networks, the different networks respectively require different network credentials for access, the different networks comprise the first target network and a second network, wherein the first target network comprises a network area to which the first target mobile terminal connects after crossing the preset network alternating area, and the preset spare connection mode refers to a wireless communication technique other than that provided by a connection to the first target network and other than that provided by a connection to the second network, wherein the preset spare connection mode comprises using a long range radio (LoRa) for sending the updated network credential;

receiving a connection request for connecting to the first target network that is sent by the first target mobile terminal; and establishing the connection of the first target network with the first target mobile terminal, in response to verifying that the connection request for the first target network matches the updated network credential of the first target network.

2. A non-transitory computer readable medium, storing a computer program, wherein the program, when executed by a processor, implements the method according to claim 1.

3. The method according to claim 1, wherein the determining that the first target mobile terminal is arriving at the preset network alternating area comprises:

determining based on a motion path of the first target mobile terminal provided by a backend server; and/or determining based on location data received from the first target mobile terminal via the second network.

4. The method according to claim 1, wherein the sending in response to determining that there is a first target mobile terminal arriving at a preset network alternating area, an updated network credential of a first target network to the first target mobile terminal using a preset spare connection mode further comprises:

transmitting the network credential of the first target network to the first target mobile terminal using the preset spare connection mode prior to the first target mobile terminal disconnecting from the second network; or based on the predicted motion path of the first target mobile terminal, transmitting the network credential of the first target network to the first target mobile terminal using the preset spare connection mode in advance of the first target mobile terminal arriving at the location of the preset network alternating area.

5. The method according to claim 1, wherein the first target mobile network and the second network comprise Wi-Fi wireless networks.

6. The method according to claim 1, wherein the method further comprises:

instructing the mobile terminal to stop traveling, in response to detecting using a first long range radio (LoRa) transmission terminal on the mobile terminal that a distance from a second long range radio (LoRa) transmission terminal is less than a preset distance; and instructing the mobile terminal to resume traveling, in response to detecting using the first long range radio (LoRa) transmission terminal on the mobile terminal that the distance from the second LoRa transmission terminal is not less than the preset distance.

7. The method according to claim 1, wherein the method further comprises:

determining whether a preset network credential update condition is met, wherein a network credential indicated by the preset network credential update condition is used for establishing a connection to a second target network;

sending an updated network credential of the second target network to at least one mobile terminal using the preset spare connection mode in response to determining that the preset network credential update condition is met;

receiving a connection request for the second target network that is sent by a second target mobile terminal among the at least one mobile terminal; and establishing the connection of the second target network with the second target mobile terminal, in response to determining that the connection request for the second target network matches the updated network credential of the second target network.

8. The method according to claim 7, wherein determining whether the preset network credential update condition is met comprises:

determining that the preset network credential update condition is met, in response to determining that a current moment reaches preset network credential change time.

9. The method according to claim 7, wherein determining whether the preset network credential update condition is met comprises:

determining whether the network credential changes; and determining that the preset network credential update condition is met, in response to determining that the network credential changes.

10. The method according to claim 9, wherein determining whether the network credential changes comprises:

determining that the network credential changes, in response to receiving a network credential change instruction.

11. A server for providing updated network connection credentials via a preset backup communication channel to a mobile robot, the server comprising:

one or more processors; and a memory, storing one or more programs, wherein the one or more programs, when executed by a processor, cause the processor to perform operations, the operations comprising:

sending, in response to determining that there is a first target mobile terminal arriving at a preset network alternating area, an updated network credential of a first target network to the first target mobile terminal using a preset spare connection mode, wherein the first target mobile terminal comprises the mobile robot, wherein the preset network alternating area comprises a junction area between two areas within coverage ranges of different networks, the different networks respectively require different network credentials for access, the different networks comprise the first target network and a second network, wherein the first target network comprises a network area to which the first target mobile terminal connects after crossing the preset network alternating area, and the preset spare connection mode refers to a wireless communication technique other than that provided by a connection to the first target network and other than that provided by a connection to the second network, wherein the preset spare connection mode comprises using a long range radio (LoRa) for sending the updated network credential;

receiving a connection request for connecting to the first target network that is sent by the first target mobile terminal; and establishing the connection of the first target network with the first target mobile terminal, in response to verifying that the connection request for the first target network matches the updated network credential of the first target network.

12. The server according to claim 11, wherein the operations further comprise:

determining whether a preset network credential update condition is met, wherein a network credential indicated by the preset network credential update condition is used for establishing a connection to a second target network;

sending an updated network credential of the second target network to at least one mobile terminal using the preset spare connection mode in response to determining that the preset network credential update condition is met;

receiving a connection request for the second target network that is sent by a second target mobile terminal among the at least one mobile terminal; and establishing the connection of the second target network with the second target mobile terminal, in response to determining that the connection request for the second target network matches the updated network credential of the second target network.

13. The server according to claim 12, wherein determining whether the preset network credential update condition is met comprises:

determining that the preset network credential update condition is met, in response to determining that a current moment reaches preset network credential change time.

14. The server according to claim 12, wherein the connection request comprises a newest network credential acquired by the target mobile terminal.

15. The server according to claim 12, wherein determining whether the preset network credential update condition is met comprises:

determining whether the network credential changes; and determining that the preset network credential update condition is met, in response to determining that the network credential changes.

16. The apparatus according to claim 15, wherein determining whether the network credential changes comprises:

determining that the network credential changes, in response to receiving a network credential change instruction.

17. A system for transmitting a network connection credential for a target Wi-Fi network via a preset backup communication channel to a mobile robot roaming between network coverage areas, the system comprising:

a server side and a mobile terminal comprising the mobile robot, wherein the server side is configured to: broadcast using a Long Range Radio (LoRa) as a preset spare connection mode a network credential of the target WiFi network to the mobile terminal in response to determining, based on at least one of received location data of the mobile terminal and a motion path of the mobile terminal, that the mobile terminal is arriving from a coverage area of a first WiFi network at a preset network alternating area, wherein the preset network alternating area comprises a junction area between two areas within coverage ranges of different networks which comprise the target WiFi network and the first WiFi network, each of which uses respectively different network credentials for access, wherein the target WiFi network comprises a network area to which the mobile terminal will be connected to after crossing the preset network alternating area, receive a connection request for the target WiFi network that is sent by the mobile terminal; and establish the connection of the target WiFi network with the mobile terminal, in response to verifying that the connection request for the target network matches the network credential of the target WiFi network; and the mobile terminal is configured to receive using a first long range radio (LoRa) transmission terminal, a network credential using the preset spare connection mode, and after receipt send a connection request based on the received network credential for the target WiFi network to the server side.

18. The system according to claim 17, wherein the mobile terminal is further configured to:

stop traveling, in response to detecting using the first long range radio (LoRa) transmission terminal on the mobile terminal that a distance from a second long range radio (LoRa) transmission terminal is less than a preset distance; and resume traveling, in response to detecting using the first long range radio (LoRa) transmission terminal on the mobile terminal that the distance from the second LoRa transmission terminal is not less than the preset distance.

19. The system according to claim 18, wherein the second LoRa transmission terminal is provided as a wearable terminal.

* * * * *